Patented May 15, 1934

UNITED STATES PATENT OFFICE 1,958,700

COMPOSITION OF MATTER

Benjamin R. Harris, Chicago, Ill.

No Drawing. Application November 16, 1929, Serial No. 407,797

13 Claims. (Cl. 8—6)

My invention relates to improved compositions of matter, and methods of making the same, together with an improved process adapted for use in the arts, which process employs my improved compositions.

The invention is based particularly on the employment of a new type of substance which I term a hydrophyllic lipin, and which I describe in detail in my co-pending applications Serial No. 383,143, filed August 2, 1929; Serial No. 431,964, filed February 27, 1930; and Serial No. 407,796, filed November 16, 1929. It is sufficient to state for the present that these substances are oily in most respects but have the unusual property of being wetted by water or by oil, while at the same time they may be insoluble in both of these media. These substances are produced in solid form at ordinary room temperatures and are so constituted that they can be produced in the shape of a cake, crayon, or the like, and may contain water or oil soluble substances in a form dispersed through the hydrophyllic lipoid so that when the resulting composition is exposed to a substance in which the dispersed material is soluble, such dispersed material will be given up to the medium in such a way as to function in accordance with its intended use.

I shall give examples of the use of my invention first, for the sake of clearness, and shall then treat more fully of the features of the invention. Among the substances or articles which I have produced in accordance with the present invention are an improved lipstick, a cake for tinting fabrics, a cake for discharging colors in textiles, disinfectant materials, and the like. These are examples of the use of my invention, but are simply suggestions as the invention is adapted to a large number of kindred uses.

Among the hydrophyllic lipin or lipoid substances which I may use in the practice of my invention are the following:

1,6-dilauryl diglycerol
Mono mellisyl ester of diethylene glycol
Mono oleyl diglycerol
Mono-abietic acid ester of triglycerol
Mono stearyl glycerol
Mono cetyl ether of glycerol
Mono oleyl glycerol
Di ethylene glycol mono-stearate as well as their "sulphonated" derivatives, and their salts. In these latter cases, esters are formed with sulphuric acid which makes the product more hydrophyllic.

As an example, among the substances I can use are:

Mono stearyl glycerine sulphate
Mono stearyl polyglycerol sulphate
"Sulphonated" oleo stearine.

These substances may be selected to be insoluble in either oil or water, but have the very unusual property of being quickly and freely wetted by oil or water so that they will disperse readily therein. Substances of this character have remarkable penetrating properties and in their normal state are solid so that they can be made into the form of sticks or cakes, which forms are very convenient and desirable in certain instances.

As one example of my invention I take about 90 parts of mono stearyl glycerine and incorporate in it dyes having a suitable color for reddening the lips, and of a water soluble variety so that they may be made to stain the lips. An example of such dyes used with the mono stearyl glycerine would be approximately 8 parts of amaranth and 2 parts of ponceau 3R. The hydrophyllic lipoid substance is melted and the dyes in powdered form incorporated in it, after which the resulting composition is molded into any desired shape, usually sticks for the lips, and is then adapted for use to tint the skin. There are advantages in using a lipstick of this character because if the lips are first wetted and the preparation brought into contact with the surface thereof, it will disperse uniformly, the water soluble dye staining the mucous membrane, and the hydrophyllic lipin functioning to aid the dye in making the necessary contact with the skin. The lipstick so applied will remain on the lips for a very considerable length of time and will have an appearance of naturalness not possible with the grease paint type of lipstick now employed.

Another example of the invention is the incorporation of a hydrophyllic lipoid substance of the character set forth, with a water soluble dye capable of dyeing fabrics, the composition being furnished in the form of a cake and the fabric washed therewith. The hydrophyllic lipins of my invention are dispersed in water more readily than soap which is now used in certain instances in this way, and have other advantages as a wetting agent, etc., which shall be brought out.

My invention lends itself to use with a so-called "white" soap dye which discharges the colors in textiles and which can be furnished in the form of a cake so that the fabric or textile can be washed therewith. Whether the color originally imparted to the fabric is a dye or a lake, my substances may be employed as wetting agents for the purpose of producing good contact between the aqueous discharging medium and the textile. In cases where the discharging medium is of acid character, such as an acid sulfoxylate solution or suspension, or an acid persulphate solution and the like, only wetting agents compatible with acid media can be employed. My products are suitable for this purpose. In the event that it is desired to make the acid discharging agent into a cake, stick or pellet with the wetting agent, my product may be conveniently used for this purpose, whereas the liquid sulphonated oils of commerce for example, are entirely unsuitable. I may make a cake from such a hydrophyllic lipoid substance as sulphonated beef stearine with zinc formaldehyde sulfoxylate and tartaric acid. One of the advantages of using my compounds in the dye industry in place of the soaps which are now used, is that ordinary soap is slightly alkaline in nature and consequently not compatible with acid dyes. My substances, however, such as mono stearyl glycerine, or the sodium salt of sulphonated mono glycerol are substantially neutral in reaction, and consequently a larger number of dyes can be used in connection therewith. Moreover, they may be selected in accordance with the function they will have to perform, and the substances which are to be used with them.

The hydrophyllic lipoid substances enumerated above can be used as carrying agents for various disinfectants such as resorcin, and when the product comes in contact with a moistened surface it will yield unto the moistened surface the substances which will be dispersed in it. Disinfectants or medicinal agents of this character may be used alone with my substances, or they may be used in connection with other materials. For example, medicinal or skin softening agents can be used in addition to the dyes in lipsticks.

What I claim is new and desire to protect by Letters Patent of the United States is:

1. A cosmetic preparation including a solid hydrophyllic lipin having hydrophile and lipophile groups and a water soluble dye dispersed therein, said dye adapted to be effective when placed in contact with an aqueous substance, and the hydrophyllic lipin functioning as a wetting or penetrating agent.

2. A lip stick in the form of a solid cake and including a solid hydrophyllic lipin having hydrophile and lipophile groups, and water soluble dye dispersed therein.

3. A lip stick including mono stearyl glycerine, and water soluble coloring matter dispersed therethrough.

4. An article of manufacture including a solid hydrophyllic lipoid substance having lipophile and hydrophile groups, and a water soluble organic medicinal agent dispersed therein.

5. A new article of manufacture including a solid hydrophyllic lipoid substance having lipophile and hydrophile groups solid at room temperature, and a water soluble dye substance dispersed therein.

6. A lipstick including a hydrophyllic lipoid substance having lipophile and hydrophile groups solid at room temperature, a water soluble dye substance, and a water soluble medicinal agent.

7. A new composition of matter including a solid hydrophillic lipin having lipophile and hydrophile groups and a water soluble dye discharging agent.

8. A new composition of matter including a solid hydrophillic lipin having lipophile and hydrophile groups, and a water soluble dye discharging agent in the form of a salt of an acidic derivative of sulphur, the discharging agent being dispersed in the hydrophillic lipin.

9. A new composition of matter including a solid hydrophillic lipin having lipophile and hydrophile groups, and a sulphoxylate dispersed therein.

10. A new composition of matter including a solid glycerol ester having lipophile and hydrophile groups, and a water soluble dye discharging agent dispersed therein, said discharging agent being a salt of an acidic derivative of sulphur.

11. A new composition of matter including a solid polyglycerol ester having lipophile and hydrophile groups, and a water soluble dye discharging agent dispersed therein, said discharging agent having a salt of an acidic derivative of sulphur.

12. A new composition of matter including mono-stearyl glycerol and a water soluble dye discharging agent, dispersed therein, said discharging agent being a salt of an acidic derivative of sulphur.

13. A new composition of matter including a solid hydrophyllic lipin having lipophile and hydrophile groups and having dispersed therein a water soluble color modifying agent.

BENJAMIN R. HARRIS.